(12) United States Patent
Nilsson et al.

(10) Patent No.: US 9,989,628 B2
(45) Date of Patent: Jun. 5, 2018

(54) PULSED LEVEL GAUGE SYSTEM WITH TEMPERATURE-BASED CONTROL OF PULSE REPETITION FREQUENCY

(75) Inventors: Leif Nilsson, Linköping (SE); Håkan Delin, Linköping (SE); Håkan Nyberg, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 1295 days.

(21) Appl. No.: 13/537,676

(22) Filed: Jun. 29, 2012

(65) Prior Publication Data

US 2014/0005959 A1    Jan. 2, 2014

(51) Int. Cl.
*G01F 23/00* (2006.01)
*G01S 7/40* (2006.01)
*G01S 13/88* (2006.01)

(52) U.S. Cl.
CPC .......... *G01S 7/4008* (2013.01); *G01S 13/88* (2013.01)

(58) Field of Classification Search
CPC .................................................. G01S 7/4008
See application file for complete search history.

(56) References Cited

U.S. PATENT DOCUMENTS

| | | | |
|---|---|---|---|
| 5,837,885 A * | 11/1998 | Goodbread | B82Y 15/00 310/338 |
| 7,098,843 B2 * | 8/2006 | Abrahamsson | G01F 23/284 342/124 |
| 7,412,337 B2 | 8/2008 | Michalski et al. | |
| 2007/0103333 A1 * | 5/2007 | Michalski | G01F 23/284 340/853.1 |
| 2009/0146746 A1 * | 6/2009 | Unkrich | H03L 1/022 331/70 |
| 2009/0288482 A1 * | 11/2009 | Faist | G01C 9/00 73/290 R |
| 2012/0056628 A1 * | 3/2012 | Michalski | G01F 23/284 324/629 |

* cited by examiner

*Primary Examiner* — Hyun Park
(74) *Attorney, Agent, or Firm* — Westman, Champlin & Koehler P.A.

(57) ABSTRACT

The present invention relates to a method of controlling a pulsed radar level gauge system, comprising the steps of: acquiring a signal indicative of a present operating temperature; determining an initial frequency control parameter for control of at least one of transmission signal generating circuitry and reference signal generating circuitry based on the present operating temperature and a plurality of data sets each comprising data indicative of a previous operating temperature and a previously determined frequency control parameter for the previous operating temperature; and controlling, starting from the initial frequency control parameter, at least one of the transmission signal generating circuitry and the reference signal generating circuitry to achieve the known frequency difference between the first pulse repetition frequency and the second pulse repetition frequency at the present operating temperature.

10 Claims, 4 Drawing Sheets

| Temp | $V_{VCO2}$@$\Delta f$ |
|---|---|
| $T_1$ | $V_1$ |
| $T_2$ | $V_2$ |
| $T_3$ | $V_3$ |
| ⋮ | ⋮ |

PULSED LEVEL GAUGE SYSTEM WITH TEMPERATURE-BASED CONTROL OF PULSE REPETITION FREQUENCY

FIELD OF THE INVENTION

The present invention relates to a pulsed level gauge system and to a method of controlling such a pulsed level gauge system.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank. The probe may also be arranged in a measurement tube, a so-called chamber, that is connected to the outer wall of the tank and is in fluid connection with the inside of the tank.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the frequency difference between a transmitted frequency-modulated signal and its reflection at the surface. The latter type of systems are generally referred to as being of the FMCW (Frequency Modulated Continuous Wave) type.

For pulsed radar level gauge systems, time expansion techniques are generally used to resolve the time-of-flight.

Such pulsed radar level gauge systems may have a first oscillator for generating a transmission signal formed by pulses for transmission towards the surface of the product contained in the tank with a transmitted pulse repetition frequency $f_t$, and a second oscillator for generating a reference signal formed by reference pulses with a reference pulse repetition frequency $f_{ref}$ that differs from the transmitted pulse repetition frequency by a known frequency difference $\Delta f$. This frequency difference $\Delta f$ is typically in the range of Hz or tens of Hz.

At the beginning of a measurement sweep, the transmission signal and the reference signal are synchronized to have the same phase. Due to the frequency difference $\Delta f$, the phase difference between the transmission signal and the reference signal will gradually increase during the measurement sweep.

During the measurement sweep, the reflection signal formed by the reflection of the transmission signal at the surface of the product contained in the tank is correlated with the reference signal, so that an output signal is only produced when a reflected pulse and a reference pulse occur at the same time. The time from the start of the measurement sweep to the occurrence of the output signal resulting from the correlation of the reflection signal and the reference signal is a measure of the phase difference between the transmission signal and the reflection signal, which is in turn a time expanded measure of the time-of-flight of the reflected pulses, from which the distance to the surface of the product contained in the tank can be determined.

Since the accuracy of the frequency difference $\Delta f$ between the transmission signal and the reference signal is important to the performance of the pulsed radar level gauge system, the second (and/or the first) oscillator can be controlled by a regulator that monitors the frequency difference $\Delta f$ and controls at least one of the first and the second oscillator to achieve a frequency difference that is known and sufficiently close to the desired frequency difference $\Delta f_{des}$ for which the pulsed radar level gauge system is designed.

To provide a stable regulation, the regulator may need in the order of hundreds of samples of the frequency difference $\Delta f$ which corresponds to a time duration which can be as long as 20-30 seconds due to the low value of the frequency difference $\Delta f$ that is desired to achieve a sufficient time expansion.

Accordingly, currently available pulsed radar level gauge systems may need to be powered for a substantial period of time before the actual filling level measurement can start.

U.S. Pat. No. 7,412,337 discloses a method aimed at reducing the time needed to control the first and/or second oscillator to achieve the desired frequency difference $\Delta f$. In the method according to U.S. Pat. No. 7,412,337, the gradient of at least two control variable-difference frequency data points is determined, and on the basis of the gradient and the difference frequency, an operating point of the control is determined and the control algorithm is adjusted. The method according to U.S. Pat. No. 7,412,337, however, appears relatively complicated and cumbersome, and there also appears to be room for further improvement in respect of reducing the time needed for the control.

SUMMARY

In view of the above, a general object of the present invention is to provide an improved pulsed radar level gauge system and method, and in particular a pulsed radar level gauge system and method enabling a more energy efficient filling level determination.

According to a first aspect of the present invention, it is therefore provided a method of controlling a pulsed level gauge system comprising: transmission signal generating circuitry for generating an electromagnetic transmission signal in the form of a first pulse train having a first pulse repetition frequency; a propagation device connected to the transmission signal generating circuitry and arranged to propagate the electromagnetic transmission signal towards a surface of a product contained in a tank, and to return an electromagnetic reflection signal resulting from reflection of the electromagnetic transmission signal at the surface of the product; reference signal generating circuitry for generating an electromagnetic reference signal in the form of a second pulse train having a second pulse repetition frequency; and processing circuitry for determining a filling level of the product based on the electromagnetic reflection signal, the electromagnetic reference signal and a known frequency difference close to a predetermined frequency difference between the first pulse repetition frequency and the second pulse repetition frequency, wherein the method comprises the steps of: acquiring a signal indicative of a present operating temperature; determining an initial frequency control parameter for control of at least one of the transmission signal generating circuitry and the reference signal generating circuitry based on the present operating temperature and a plurality of data sets each comprising data indicative of a previous operating temperature and a previously determined frequency control parameter that resulted in the predetermined frequency difference, or a known frequency difference close to the predetermined frequency difference, between the first pulse repetition frequency and the second pulse repetition frequency at the previous operating temperature; and controlling, starting from the initial frequency control parameter, at least one of the transmission signal generating circuitry and the reference signal generating circuitry to achieve the known frequency difference between the first pulse repetition frequency and the second pulse repetition frequency at the present operating temperature.

In cases when the initial frequency control parameter results in a frequency difference that is sufficiently close to the desired frequency difference, the step of controlling at least one of the transmission signal generating circuitry and the reference signal generating circuitry to achieve the known frequency difference may simply involve to control the transmission signal generating circuitry and/or the reference signal generating circuitry using the initial frequency control parameter. If it is determined that the resulting frequency difference (the known frequency difference) differs only slightly from the desired frequency difference, then this can be compensated for by the processing circuitry.

The present invention is based on the realization that the time it takes to control the transmission signal generating circuitry and/or the reference signal generating circuitry to achieve a frequency difference that is sufficiently close to the desired frequency difference is not constant but depends on a difference between the frequency control parameter (such as voltage) that results in the desired frequency difference and the initial frequency control parameter at which the control procedure is started. Generally, if the initial frequency control parameter is close to the "final" frequency control parameter (the frequency control parameter that results in the known frequency difference that is sufficiently close to the desired frequency difference), the control procedure will take less time than if the initial frequency control parameter is further from the "final" frequency control parameter.

The present inventors have further realized that the above-mentioned "final" frequency control parameter will vary for the pulsed level gauge system mainly depending on the operating temperature of the transmission signal generating circuitry and the reference signal generating circuitry, and that the time to achieve the desired frequency difference can be shortened considerably if the present operating temperature is checked and the initial frequency control parameter is selected depending on the present operating temperature.

If a frequency difference is sufficiently close to the desired frequency difference will depend on the system design, in particular the design of band pass filters etc. If it is deemed by the system designer that acceptable measurement performance for a given application can be achieved within a certain range around a desired frequency difference, then the frequency difference values within that range are sufficiently close to the desired frequency difference.

Hereby, more efficient control of the difference frequency than was previously possible can be achieved, which means that the time from powering up the pulsed level gauge system until a reliable filling level determination can be performed can be shortened considerably. This in turn provides for a more energy-efficient pulsed level gauge system, since intermittent operation with shorter active periods can be used. This is particularly useful for battery-powered pulsed level gauge systems, and can provide for a longer battery life and/or a higher update rate.

The present operating temperature may advantageously be the present operating temperature of the part of the level gauge system containing the transmission signal generating circuitry and the reference signal generating circuitry.

The initial frequency control parameter may, for example, be determined by selecting the closest match among the stored data sets. Alternatively, the initial frequency control parameter may be determined through interpolation or extrapolation using the stored data sets.

According to various embodiments of the present invention, the method may further comprise the step of storing a data set comprising data indicative of the present operating temperature and a present frequency control parameter for the present operating temperature.

In these embodiments, the pulsed level gauge system is a self-learning system that will gradually build a better database of operating temperatures and corresponding frequency control parameters that resulted in the predetermined frequency difference at the corresponding operating temperature. This provides for a gradually reduced startup time of the pulsed level gauge system, that in turn results in a further improved energy-efficiency as discussed above.

Alternatively, or in addition, a temperature characterization may be performed in production or following installation of the pulsed level gauge system. To perform such a temperature characterization, the operating temperature of the pulsed level gauge system (at least the transmission signal generating circuitry and/or the reference signal generating circuitry) may be varied among a set of operating temperatures, and the frequency control parameters for each of the operating temperatures in the set of operating temperatures be stored together with the corresponding operating temperatures.

Through such a temperature characterization and pre-storing of data sets, the pulsed level gauge system can have the desired shortened startup time already directly following installation of the pulsed level gauge system.

According to various embodiments of the present invention, at least one of the transmission signal generating circuitry and the reference signal generating circuitry may comprise a voltage controlled oscillator and the frequency control parameter may then be a control voltage provided to the voltage controlled oscillator.

The method according to the present invention may further comprise the step of determining the filling level based on the electromagnetic reflection signal, the electromagnetic reference signal and the known frequency difference between the first pulse repetition frequency and the second pulse repetition frequency. Using the known frequency difference, time-expansion techniques can be used to determine the time-of-flight of the electromagnetic transmission signal to the surface and back. Such techniques are, per se, well known to those of ordinary skill in the art.

According to a second aspect of the present invention, it is provided a pulsed level gauge system for determining a filling level of a product contained in a tank, the pulsed level gauge system comprising: transmission signal generating circuitry for generating an electromagnetic transmission signal in the form of a first pulse train having a first pulse repetition frequency; a propagation device connected to the transmission signal generating circuitry and arranged to propagate the electromagnetic transmission signal towards a surface of the product contained in the tank, and to return an electromagnetic reflection signal resulting from reflection of the electromagnetic transmission signal at the surface of the product; reference signal generating circuitry for generating an electromagnetic reference signal in the form of a second pulse train having a second pulse repetition frequency; processing circuitry for determining a filling level of the product based on the electromagnetic reflection signal, the electromagnetic reference signal and a known frequency difference between the first pulse repetition frequency and the second pulse repetition frequency; and frequency control circuitry for controlling at least one of the transmission signal generating circuitry and the reference signal generating circuitry to achieve the known frequency difference between the first pulse repetition frequency and the second pulse repetition frequency, wherein the pulsed level gauge system further comprises: a memory for storing a plurality of data sets, each comprising data indicative of a previous operating temperature and a previously determined frequency control parameter for the previous operating temperature; and a temperature sensor for providing a signal indicative of a present operating temperature of the pulsed level gauge system.

The propagation device may be any device capable of propagating electromagnetic signals, including transmission line probes, waveguides and various types of radiating antennas such as horn antennas, parabolic antennas, rod antennas, array antennas etc.

It should be noted that the processing circuitry as well as the frequency control circuitry may be implemented as one or several microprocessors comprised in the level gauge system. The processing circuitry, the frequency control circuitry, the memory and the temperature sensor may be implemented as individual microprocessors or as integrated functions in a single microprocessor or circuit board.

The tank may be any container or vessel capable of containing a product, and may be metallic, or partly or completely non-metallic, open, semi-open, or closed. Furthermore, the filling level of the product contained in the tank may be determined directly by arranging the propagation device to propagate the transmission signal towards the product inside the tank, or indirectly by arranging the propagation device inside a so-called chamber located on the outside of the tank, but being in fluid connection with the inside of the tank in such a way that the level in the chamber corresponds to the level inside the tank.

Either or both of the transmission signal generating circuitry and the reference signal generating circuitry may comprise a voltage controlled oscillator circuit, which may comprise a crystal oscillator. Alternatively, either or both of the transmission signal generating circuitry and the reference signal generating circuitry may comprise a resonator element formed by electronic circuitry comprising a portion with inductive characteristics and a portion with capacitive characteristics.

The pulsed level gauge system may additionally comprise measurement circuitry configured to form a measurement signal comprising a sequence of values, each value representing a time correlation between a pulse of the electromagnetic reference signal and the electromagnetic reflection signal. This measurement circuitry may, for example, comprise a mixer and the measurement signal may be formed by mixing the electromagnetic reference signal and the electromagnetic reflection signal such that a pulse indicating time correlation is generated each time a reference pulse passes the time domain for the electromagnetic reflection signal. The pulses can then be provided to a sample-and-hold circuit to form a continuous signal.

The temperature sensor may be any sensor useable to sense the operating temperature of the transmission signal generating circuitry and/or the reference signal generating circuitry. The signal provided by the temperature sensor may, for example, be an electrical signal, such as a temperature dependent current or voltage.

According to various embodiments of the present invention, the processing circuitry may be further configured to acquire, from the temperature sensor, a signal indicative of the present operating temperature; determine an initial frequency control parameter of at least one of the transmission signal generating circuitry and the reference signal generating circuitry based on the present operating temperature and a plurality of data sets stored in the memory, each of the data sets comprising data indicative of a previous operating temperature and a previously determined frequency control parameter that resulted in a frequency difference sufficiently close to the desired frequency difference between the first pulse repetition frequency and the second pulse repetition frequency at the previous operating temperature; and control the frequency control circuitry to initiate its control of at least one of the transmission signal generating circuitry and the reference signal generating circuitry at the initial frequency control parameter.

That the frequency control circuitry "initiates" its control of the transmission signal generating circuitry and/or the reference signal generating circuitry at the initial frequency control parameter should, in the context of the present application, be understood to mean that the first frequency control parameter provided by the frequency control circuitry to the transmission signal generating circuitry and/or the reference signal generating circuitry is the initial frequency control parameter. The initial frequency control parameter will result in an initial frequency difference, which may be smaller or greater than the predetermined frequency difference. The frequency control circuitry will, if necessary, proceed to modify the frequency control parameter based on the difference between the initial frequency difference and the predetermined frequency difference according to, for example, any suitable closed loop control system configuration.

According to some embodiments, the memory for storing the plurality of data sets may comprise a memory area that contains a plurality of pre-stored data sets, each comprising data indicative of a previous operating temperature and a previously determined frequency control parameter for the previous operating temperature. The memory area may be a non-volatile memory area, such as a flash memory area.

Alternatively, or in addition, the memory may comprise a writeable memory area, and the processing circuitry may further be configured to store, in the writeable memory area, a data set comprising data indicative of the present temperature and a present frequency control parameter resulting in the known frequency difference between the first pulse repetition frequency and the second pulse repetition frequency at the present operating temperature.

Furthermore, the pulsed level gauge system may advantageously further comprise a local energy store for providing electrical energy for operation of the level gauge system. The local energy store may advantageously, for example, comprise a battery and/or a super capacitor.

Moreover, the pulsed level gauge system may further comprise wireless communication circuitry, such as a radio transceiver, for wireless communication with a remote system.

Further effects and features of this second aspect of the present invention are largely analogous to those described above in connection with the first aspect of the invention.

BRIEF DESCRIPTION OF THE DRAWINGS

These and other aspects of the present invention will now be described in more detail, with reference to the appended drawings showing an exemplary embodiment of the invention, wherein.

DETAILED DESCRIPTION OF EXAMPLE EMBODIMENTS

In the present detailed description, various embodiments of the level gauge system according to the present invention are mainly discussed with reference to a pulsed radar level gauge system of the non-contact type, in which an electromagnetic signal is propagated towards the product contained in the tank using a propagation device in the form of a radiating antenna, such as a cone antenna, a horn antenna, an array antenna or a patch antenna.

It should be noted that this by no means limits the scope of the present invention, which is equally applicable to a pulsed guided wave radar (GWR) level gauge system utilizing a propagation device in the form of a transmission line probe, such as a single line probe (including a so-called Goubau probe), a two-lead probe, a coaxial probe, etc.

Figure 1:
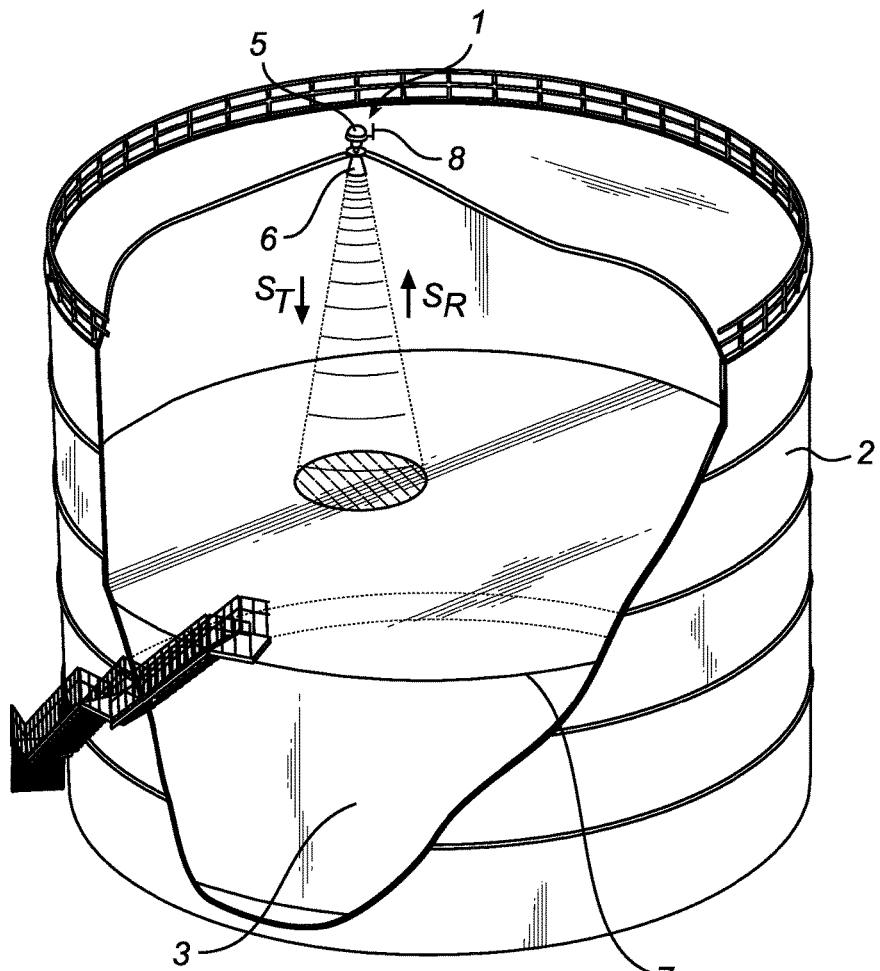
FIG. 1 schematically illustrates a pulsed level gauge system according to an embodiment of the present invention arranged to determine the filling level of a tank.

FIG. 1 schematically illustrates a level gauge system 1 arranged on top of a tank 2 for determining the filling level of a product 3 contained in the tank 2 using microwaves. The level gauge system 1 is therefore in the following referred to as a radar level gauge system or an RLG-system.

The radar level gauge system 1 comprises a measurement unit 5, a propagation device, here in the form of a horn antenna 6 for propagating microwaves towards a surface 7 of the product 3 contained in the tank 2, and a communication antenna 8 for allowing wireless communication with a remote device.

When measuring the filling level of the product 3 contained in the tank 2, the radar level gauge system 1 transmits an electromagnetic transmission signal $S_T$ by the horn antenna 6 towards the surface 7 of the product 3, where the signal is reflected as a surface echo signal $S_R$. The distance between a reference position at the top of the tank 2 and the surface 7 of the product 3 is then determined based on the time-of-flight of the surface echo signal $S_R$ (from the radar level gauge system 1 to the surface 7 and back). From this distance and known dimensions of the tank 2, the filling level can be deduced.

It should be noted that, although a tank 2 containing a single product 3 is discussed herein, the distance to any material interface present in the tank 2 can be measured in a similar manner.

As is schematically illustrated in FIG. 1, the exemplary level gauge system 1 is configured to communicate with external devices, such as a remote control center, using wireless data transmission. For different applications, this may be advantageous, as wiring for communication may often represent a significant part of the cost for installing a level gauge system. A level gauge system configured for wireless communication may often also be required to receive power from a local energy store, such as a battery or similar. To keep the maintenance cost of the level gauge system 1 down, battery life should be as long as possible, preferably in the order of several years, which means that it is important to design the level gauge system 1 for a very low average energy consumption, without compromising the performance of the level gauge system 1 in terms of, for example, accuracy and ability to monitor changes in the tank 2.

Figure 2:
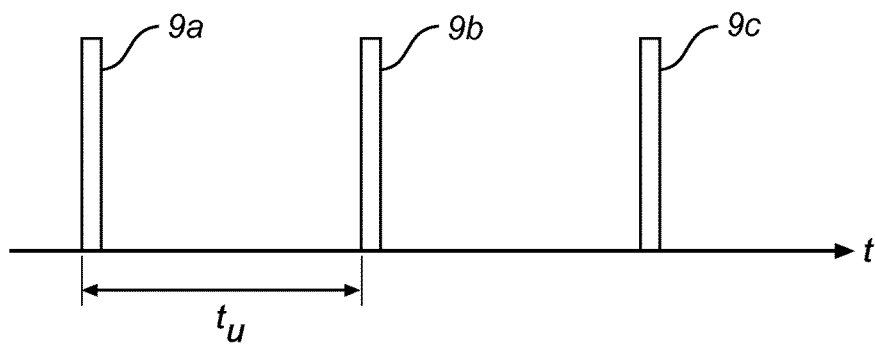
FIG. 2 schematically illustrates a driving scheme for intermittent operation of the level gauge system in FIG. 1.

A widely used scheme for handling situations where the average energy consumption is important is schematically illustrated in FIG. 2. As is indicated in FIG. 2, filling level determination events 9a-c are separated in time, and between these filling level determination events 9a-c, the level gauge system 1 is in a sleep mode, where parts of the level gauge system that are used to determine the filling level may be turned off. This scheme is often referred to as intermittent operation, and the time $t_u$ between the filling level determination events defines an update frequency.

For a pulsed level gauge system, the various aspects of the present invention provide for shortening the duration of the filling level determination events 9a-c as compared to pulsed level gauge systems in the prior art.

This will be described in further detail below with reference to FIGS. 3 to 6.

Figure 3:
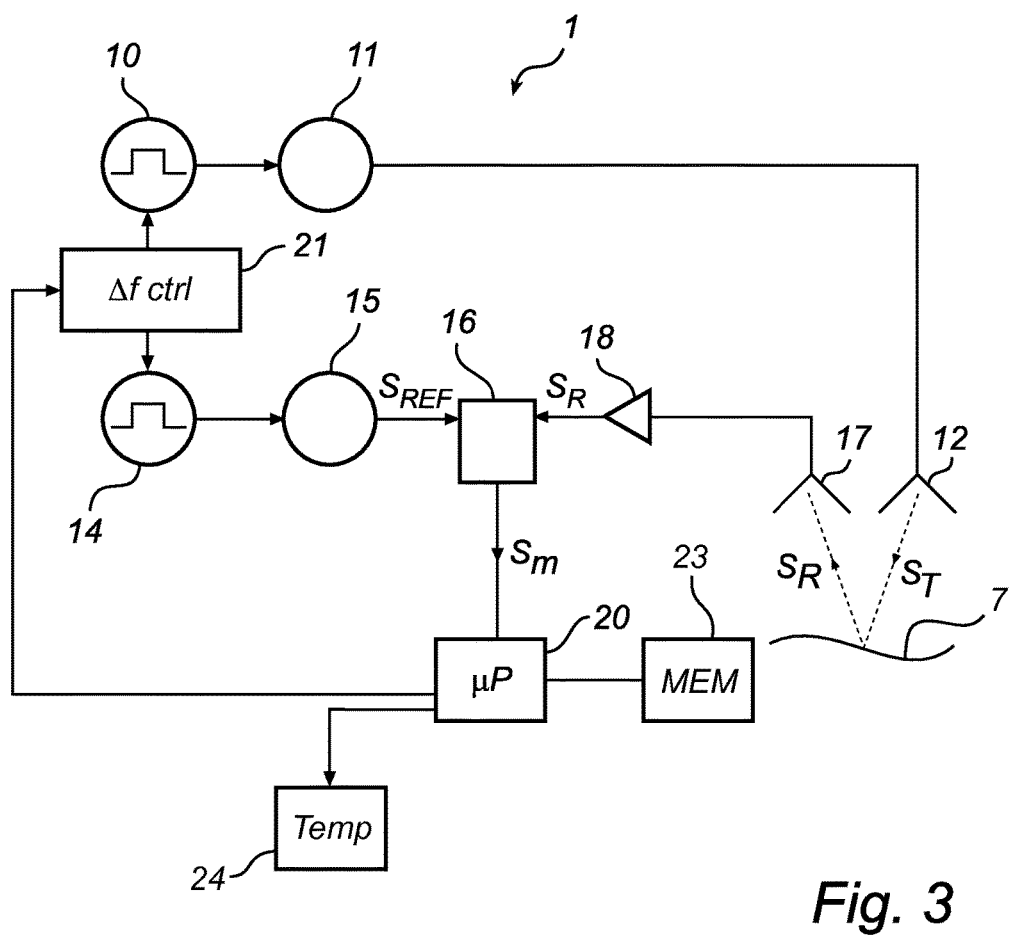
FIG. 3 is a schematic block diagram of the pulsed level gauge system in FIG. 1.

FIG. 3 is a block diagram schematically showing functional components comprised in the level gauge system in FIG. 1. The exemplary level gauge system 1 comprises a transmitter branch and a receiver branch.

The transmitter branch comprises transmission signal generating circuitry, here provided in the form of a transmission pulse generator 10 and a first RF-source 11, and a transmitting antenna 12. The receiver branch comprises reference signal providing circuitry, here provided in the form of a reference pulse generator 14 and a second RF-source 15, measurement circuitry 16, and a receiving antenna 17. The receiver branch further comprises a low noise amplifier 18 for amplifying the signals received by the receiving antenna 17.

In the transmitter branch, the microwaves generated by the first RF-source 11 are modulated by the transmission pulses provided by the transmission pulse generator 10 so that a transmission signal $S_T$ in the form of a sequence of transmission pulses (short "packets" of microwave energy) is formed and is radiated towards the surface 7 of the product by the transmitting antenna 12.

The reflected signal $S_R$ is received by the receiving antenna 17 and is, following amplification in the low noise amplifier 18, forwarded to the measurement circuitry 16. The measurement circuitry 16 is also provided with a reference signal $S_{REF}$, which is formed by the reference pulse generator 14 and the second RF-source 15 as was described above for the generation of the transmission signal $S_T$.

The transmission pulse generator 10 and the reference pulse generator 14 generate pulses with slightly different pulse repetition frequencies. The frequency difference $\Delta f$ between the transmission pulse repetition frequency and the reference pulse repetition frequency may be in the order of Hz or tens of Hz.

In the measurement circuitry 16, the reference signal $S_{REF}$ and the reflected signal $S_R$ are time correlated to form a time-expanded measurement signal $S_m$, which is provided to the microprocessor 20, where the distance to the surface 7 of the product is determined based on the measurement signal $S_m$.

The measurement circuitry 16 may, for example, comprise a mixer and a sample-and-hold amplifier, but could be implemented in other ways known to those skilled in the art. For example, the sample-and-hold amplifier may be configured to achieve time-correlation by controlling the sampling switch using the reference signal $S_{REF}$.

The pulses of the transmission signal $S_T$ and the pulses of the reference signal $S_{REF}$ may advantageously be in phase at the start of a measurement sweep so that the time until there is correlation between the reference signal $S_{REF}$ and the reflected signal $S_R$ together with the known frequency difference $\Delta f$ can be used to determine the time-of-flight of the reflected signal $S_R$. The time-of-flight is then used to determine the filling level.

As can be seen in FIG. 3, the level gauge system 1 further comprises frequency control circuitry 21, which is connected to the microprocessor 20, and to the transmission pulse generator 10 and the reference pulse generator 14, for controlling the pulse repetition frequency of at least one of the transmission pulse generator 10 and the reference pulse generator 14.

The pulsed level gauge system 1 further comprises a memory 23 and a temperature sensor 24, which are both connected to the microprocessor 20.

In a pulsed level gauge system 1 utilizing time-expansion techniques for forming a time-expanded measurement signal $S_m$ from which the filling level can be determined as described above, it is important that at least one of the transmission pulse generator 10 and the reference pulse generator 14 is controlled by the frequency control circuitry 21 to achieve the desired frequency difference $\Delta f$ at least before the start of each filling level determination event 9a-c.

As was mentioned in the Summary section above, the time required for this control has been found to depend upon the difference between an initial frequency control parameter and the "final" frequency control parameter that results in a frequency difference sufficiently close to the desired frequency difference $\Delta f$. However, the "final" frequency control parameter will depend on the present operating temperature of the pulsed level gauge system 1 (in particular the present operating temperature of the transmission pulse generator 10 and the reference pulse generator 14).

The relation between operating temperature and frequency control parameter will be discussed in greater detail below with reference to FIG. 4, which is a diagram that schematically illustrates the temperature dependence of the frequency difference control of an exemplary pulsed level gauge system.

Figures 4, 5:
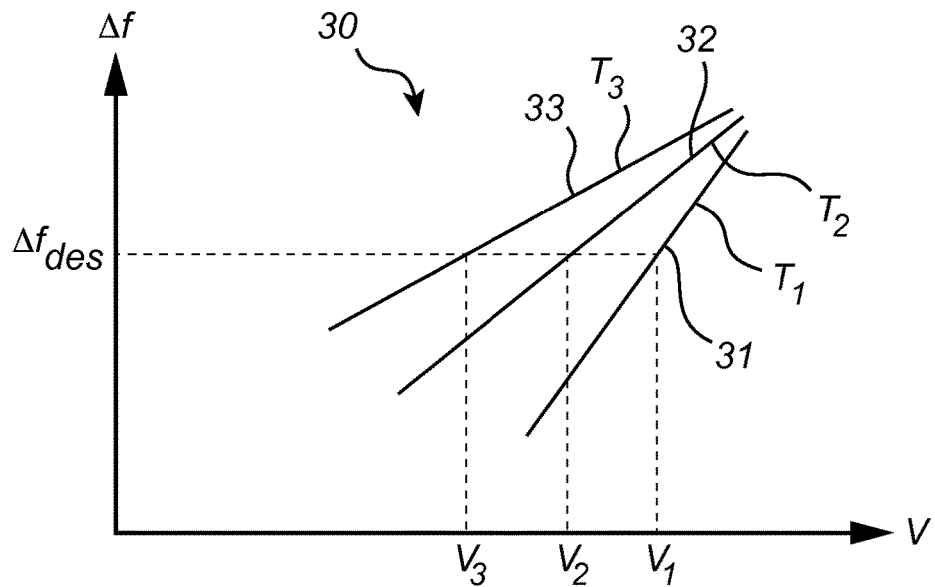
FIG. 4 is a diagram schematically illustrating an exemplary temperature dependence of the relation between a frequency control parameter and the frequency difference.
FIG. 5 is a table with sets of corresponding operating temperatures and frequency control parameters that resulted in the predetermined frequency difference at the corresponding operating temperatures.

As can be seen in FIG. 4, the diagram 30 contains a first curve 31a second curve 32 and a third curve 33. The first curve 31 represents the relation, at a first operating temperature $T_1$, between a frequency control parameter V (the control voltage provided to the reference pulse generator 14 assuming a constant control voltage being provided to the transmission pulse generator 10) and the frequency difference $\Delta f$ between the transmission pulse repetition frequency $PRF_t$ of the transmission pulse generator 10 and the reference pulse repetition frequency $PRF_{ref}$ of the reference pulse generator 14. The second 32 and third 33 curves represent the same relations for a second $T_2$ and a third $T_3$ temperature, respectively. The second temperature $T_2$ is higher than the first temperature $T_1$ and the third temperature $T_3$ is higher than the second temperature $T_2$.

As is indicated in FIG. 4, different control voltages $V_1$-$V_3$ will result in the desired frequency difference $\Delta f_{des}$ for the different operating temperatures $T_1$-$T_3$.

As is schematically shown in FIG. 5, each operating temperature $T_1$-$T_3$ and its corresponding frequency control parameter (here control voltage $V_1$-$V_3$) are stored as data sets in the memory 23 of the pulsed level gauge system 1. These data sets are, as will be described further below with reference to the flow-chart in FIG. 6, used in various embodiments of the present invention for reducing the time needed to arrive at the desired frequency difference $\Delta f_{des}$, at least at the start of each filling level determination event 9a-c.

An embodiment of the method according to the present invention will now be described with reference to the flow-chart in FIG. 6, as well as to FIG. 3 and FIG. 5.

Figure 6:
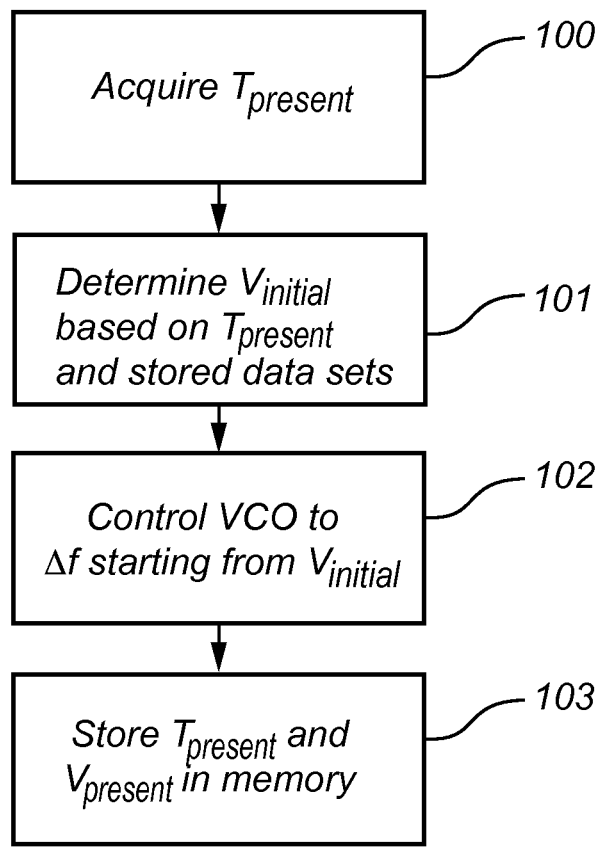
FIG. 6 is a flow chart outlining a method according to an embodiment of the invention.

Referring to FIG. 6, a signal indicative of the present operating temperature $T_{present}$ is acquired from the temperature sensor 24 by the microprocessor 20 in a first step 100.

Based on the present operating temperature $T_{present}$ and the stored data sets referred to above in connection with FIG. 5, an initial frequency control parameter, here the initial control voltage $V_{initial}$ for the VCO comprised in the reference pulse generator 14 is determined by the microprocessor 20 in step 101. If, for example, $T_{present}$ is closer to $T_2$ in the table in FIG. 5 than any of the other temperatures in the table, then the corresponding control voltage $V_2$ may be used as $V_{initial}$. Alternatively, some form of interpolation may be used. In the simplest case, if $T_{present}$ is between $T_1$ and $T_2$, $V_{initial}$ may be determined according to the following relation:

$$V_{initial} = ((V_2 - V_1)/(T_2 - T_1)) * T_{present}.$$

Of course, other and more sophisticated approximation methods are well within the reach of one of ordinary skill in the art.

Subsequently, a signal indicative of the initial control voltage $V_{initial}$ determined in step 101 is provided by the microprocessor to the frequency control circuitry 21, which, in step 102, controls the reference pulse generator 14 to achieve the desired frequency difference $\Delta f$ starting from the initial control voltage $V_{initial}$.

When the desired frequency difference $\Delta f$ has been arrived at, the present operating temperature $T_{present}$ and the control voltage $V_{present}$ that resulted in the desired frequency difference $\Delta f$ are stored, in step 103, as a further data set in the memory 23, in addition to the data sets already present in the memory 23.

The person skilled in the art realizes that the present invention by no means is limited to the preferred embodiments described above. On the contrary, many modifications and variations are possible within the scope of the appended claims, for example the control voltage used to control the reference pulse generator 14 may be kept constant and the control voltage for the transmission pulse generator 10 may be controlled, or the control voltages for both the transmission pulse generator 10 and the reference pulse generator 14 may be controlled towards achieving the desired frequency difference.

What is claimed is:

1. A method of controlling a pulsed level gauge system, said pulsed level gauge system comprising:
    a transmission signal generating circuitry for generating an electromagnetic transmission signal in the form of a first pulse train having a first pulse repetition frequency;
    a propagation device connected to said transmission signal generating circuitry and arranged to propagate said electromagnetic transmission signal towards a surface of a product contained in a tank, and to return an electromagnetic reflection signal resulting from reflection of said electromagnetic transmission signal at said surface of the product;
    a reference signal generating circuitry for generating an electromagnetic reference signal in the form of a second pulse train having a second pulse repetition frequency different from said first pulse repetition frequency; and
    a processing circuitry for determining a filling level of said product based on said electromagnetic reflection signal, said electromagnetic reference signal, and a frequency difference between said first pulse repetition frequency and said second pulse repetition frequency,
    said method comprising the steps of:
    acquiring a signal indicative of a present operating temperature;
    determining an initial frequency control parameter for control of at least one of said transmission signal generating circuitry and said reference signal generating circuitry to achieve said frequency difference, based on said present operating temperature and a plurality of data sets each comprising data indicative of a previous operating temperature and a previously determined frequency control parameter resulting in said frequency difference at said previous operating temperature; and
    controlling, starting from said initial frequency control parameter, at least one of said transmission signal generating circuitry and said reference signal generating circuitry to achieve said frequency difference between said first pulse repetition frequency and said second pulse repetition frequency at the present operating temperature.

2. The method according to claim 1, further comprising the step of:
    storing a data set comprising data indicative of said present operating temperature and a present frequency control parameter resulting in said frequency difference between said first pulse repetition frequency and said second pulse repetition frequency at said present operating temperature.

3. The method according to claim 1, wherein at least one of said transmission signal generating circuitry and said reference signal generating circuitry comprises a voltage controlled oscillator, and said frequency control parameter is a control voltage provided to said voltage controlled oscillator.

4. The method according to claim 1, further comprising the step of:
    determining said filling level based on said electromagnetic reflection signal, said electromagnetic reference signal and said frequency difference between said first pulse repetition frequency and said second pulse repetition frequency.

5. A pulsed level gauge system for determining a filling level of a product contained in a tank, said pulsed level gauge system comprising:
    a transmission signal generating circuitry for generating an electromagnetic transmission signal in the form of a first pulse train having a first pulse repetition frequency;
    a propagation device connected to said transmission signal generating circuitry and arranged to propagate said electromagnetic transmission signal towards a surface of the product contained in the tank, and to return an electromagnetic reflection signal resulting from reflection of said electromagnetic transmission signal at said surface of the product;
    a reference signal generating circuitry for generating an electromagnetic reference signal in the form of a second pulse train having a second pulse repetition frequency different from said first pulse repetition frequency;
    a processing circuitry for determining a filling level of said product based on said electromagnetic reflection signal, said electromagnetic reference signal, and a frequency difference between said first pulse repetition frequency and said second pulse repetition frequency; and
    a frequency control circuitry for controlling at least one of said transmission signal generating circuitry and said reference signal generating circuitry to achieve said frequency difference between said first pulse repetition frequency and said second pulse repetition frequency,
    wherein said pulsed level gauge system further comprises:
    a memory for storing a plurality of data sets, each comprising data indicative of a previous operating temperature and a previously determined frequency control parameter for said previous operating temperature; and
    a temperature sensor for providing a signal indicative of a present operating temperature of said pulsed level gauge system,
    wherein said processing circuitry is further configured to:
    acquire, from said temperature sensor, a signal indicative of said present operating temperature;
    determine an initial frequency control parameter of at least one of said transmission signal generating circuitry and said reference signal generating circuitry based on said present operating temperature and a plurality of data sets stored in said memory, each of said data sets comprising data indicative of a previous operating temperature and a previously determined frequency control parameter resulting in said frequency difference at said previous operating temperature; and
    control said frequency control circuitry to initiate its control of at least one of said transmission signal generating circuitry and said reference signal generating circuitry using said initial frequency control parameter.

6. The pulsed level gauge system according to claim 5, wherein said memory comprises a memory area that contains a plurality of pre-stored data sets, each comprising data indicative of a previous operating temperature and a previously determined frequency control parameter for said previous operating temperature.

7. The pulsed level gauge system according to claim 5,
wherein said memory comprises a writeable memory area, and
wherein said processing circuitry is further configured to store, in said writeable memory area, a data set comprising data indicative of said present temperature and a present frequency control parameter resulting in said frequency difference between said first pulse repetition frequency and said second pulse repetition frequency at said present operating temperature.

8. The pulsed level gauge system according to claim 5, wherein said processing circuitry is further configured to determine said filling level based on said electromagnetic reflection signal, said electromagnetic reference signal and said frequency difference between said first pulse repetition frequency and said second pulse repetition frequency.

9. The pulsed level gauge system according to claim 5, wherein said pulsed level gauge system further comprises a local energy store for providing electrical energy for operation of said level gauge system.

10. The pulsed level gauge system according to claim 5, wherein said pulsed level gauge system further comprises wireless communication circuitry for wireless communication with a remote system.

* * * * *